United States Patent
Roy

(10) Patent No.: US 9,577,741 B2
(45) Date of Patent: Feb. 21, 2017

(54) MULTICAST SERVICE DELIVERY OVER HIGH THROUGHPUT SATELLITE IN A KA SPOT-BEAM NETWORK

(71) Applicant: Hughes Network Systems, LLC, Germantown, MD (US)

(72) Inventor: Satyajit Roy, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 64 days.

(21) Appl. No.: 14/730,558

(22) Filed: Jun. 4, 2015

(65) Prior Publication Data

US 2016/0359551 A1  Dec. 8, 2016

(51) Int. Cl.
*H04B 7/185* (2006.01)
*H04L 12/56* (2006.01)

(52) U.S. Cl.
CPC ...... *H04B 7/18523* (2013.01); *H04B 7/18513* (2013.01)

(58) Field of Classification Search
CPC ........ H04L 67/10; H04L 12/185; H04L 12/18; H04L 2001/0093; H04L 29/12292; H04L 49/201
USPC .................... 370/270, 401, 390, 430; 725/63
See application file for complete search history.

(56) References Cited

U.S. PATENT DOCUMENTS

| | | | | |
|---|---|---|---|---|
| 8,254,832 B2* | 8/2012 | Dankberg | .......... | H04B 7/18543 370/316 |
| 2005/0197060 A1* | 9/2005 | Hedinger | ............. | H04B 7/2041 455/12.1 |
| 2010/0232431 A1* | 9/2010 | Sebastian | ........... | H04N 7/17318 370/390 |
| 2013/0315125 A1* | 11/2013 | Ravishankar | ....... | H04W 72/005 370/312 |

* cited by examiner

*Primary Examiner* — Mohamed Kamara
*Assistant Examiner* — Will Lin
(74) *Attorney, Agent, or Firm* — Edell, Shapiro & Finnan LLC; Richard C. Irving

(57) ABSTRACT

A method and a satellite communication system are provided. At least one satellite gateway earth station receives at least one multicast stream from an external network. In a static forwarding mode, the at least one satellite gateway earth station replicates and forwards traffic from the at least one multicast stream over at least one first respective outroute carrier of at least one first respective spot beam of a satellite regardless of whether any terminal is arranged to actively receive any of the at least one multicast stream. In a dynamic forwarding mode, the at least one satellite gateway earth station replicates and forwards second traffic from any of the at least one multicast stream over at least one second respective outroute carrier of at least one second respective spot beam only when at least one respective terminal is arranged to actively receive the any of the at least one multicast stream.

21 Claims, 8 Drawing Sheets

MULTICAST SERVICE DELIVERY OVER HIGH THROUGHPUT SATELLITE IN A KA SPOT-BEAM NETWORK

FIELD OF THE INVENTION

The invention relates to a satellite spot-beam network, which receives one or more multicast streams from an external network, and replicates and distributes each respective multicast stream of the one or more multicast streams to multiple terminals associated with each of the respective multicast streams. In particular, a multicast stream that the satellite spot-beam network receives from an external network may be replicated, within the satellite spot-beam network, and distributed to respective multiple terminals associated with the multicast stream.

BACKGROUND

Businesses that rely on standard terrestrial networks are hamstrung by technology that was not designed for point-to-multipoint applications. In a terrestrial network, in order to send a message to 1,000 recipients, the message must be sent separately 1,000 times, thereby consuming valuable bandwidth and server resources. Even if bandwidth is available, there is no guarantee that the message will be delivered simultaneously to all destinations, let alone be delivered at all, because each message travels on a separate physical path.

Using satellite IP multicasting, one copy of the data is multicast via a satellite to an unlimited number of destination devices, thereby saving bandwidth and server resources. As the number of destination devices increase bandwidth savings multiply. A satellite's inherent broadcast capabilities guarantee that all destination devices receive the data simultaneously.

Multicast services provide a single source with an ability to transmit data to multiple destinations. Multicast services also include providing multiple sources with an ability to transmit data to multiple destinations (i.e., multipoint-to-multipoint). Videoconferencing, in which each participant can be considered as a single source transmitting to multiple participants in a videoconference, is an example of multipoint-to-multipoint multicast services.

An existing satellite network was deployed with Internet Protocol (IP) multicast services. However, the existing satellite network does not deliver each multicast stream via multiple spot beams served by one or more satellite gateway earth stations.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A satellite communication system and a method provide support for multicast sessions in a satellite communication system. A multicast stream may be received by a satellite gateway earth station from an external network. The satellite gateway earth station may replicate and forward the multicast stream over one or more respective outroute carriers of one or more spot beams of a satellite. When the satellite gateway earth station is configured to be in a static forwarding mode, the multicast stream may be replicated and forwarded regardless of whether any terminals are arranged to actively receive the multicast stream. When the satellite gateway earth station is configured to be in a dynamic forwarding mode, the multicast stream may be replicated and forwarded over multiple outroutes of multiple spot beams only when at least one respective terminal is arranged to actively receive the multicast stream via each of the multiple outroutes of the multiple spot beams.

In a first aspect of various embodiments, when the satellite gateway earth station is configured to be in the dynamic forwarding mode, the satellite gateway earth station may receive information from a terminal indicating that the terminal is arranged to actively receive multicast traffic.

In a second aspect, one or more multicast session IP addresses may be mapped to a single layer 2 spacelink MAC address, such that the satellite gateway earth station sends a packet associated with any of the one or more multicast session IP addresses to a plurality of destination terminals using the single layer 2 spacelink MAC address.

In a third aspect, multicast traffic may be securely transmitted by first encrypting the multicast traffic based on a multicast session key. Encryption, based on a single multicast session key, is performed for secure multicast traffic mapped to a single layer 2 MAC address. Thus, multicast traffic for multiple multicast session IP addresses that are transmitted over a layer 2 spacelink using a single layer 2 MAC address may be encrypted based on a single multicast session key. The multicast session key may be previously sent to a respective terminal by encrypting the multicast session key, based on a master key of the respective terminal, before transmitting the encrypted multicast session key to the respective terminal.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 9 and 10 are flowcharts that illustrate processing is some embodiments.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments, a satellite gateway earth station may receive one or more multicast streams from an external network. The satellite gateway earth station may replicate each of the one or more multicast streams and may distribute each of the one or more replicated multicast streams to associated terminals via a satellite and a respective spot beam in which each respective terminal of the associated terminals reside. Each of the respective associated terminals may belong to one or more multicast groups, each of which is associated with a respective one of the one or more multicast streams. In some embodiments, the spot beams are Ka-band spot beams. In other embodiments, other frequency bands may be used. In some of the embodiments, multicast session IP addresses of a multicast group may be associated with a layer 2 spacelink MAC address such that data transmitted via the layer 2 spacelink with the MAC address will be delivered to terminals associated with the multicast group. Some embodiments allow prioritization and classification schemes, guided by quality of service (QoS) requirements, to be applied to multicast sessions, as well as the generation and distribution of keys for encrypting and decrypting multicast traffic.

Description of Embodiments

Figure 1:
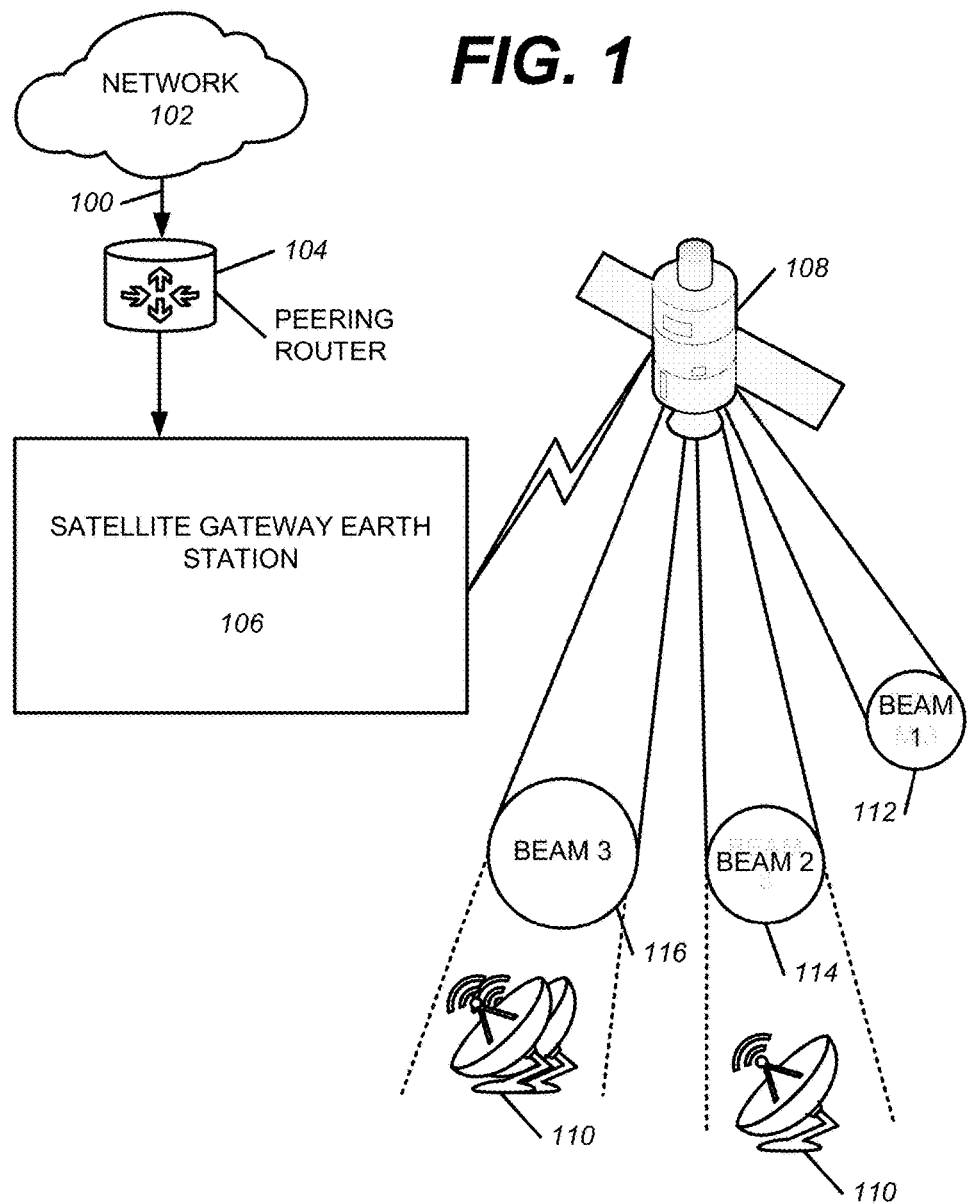
FIG. 1 illustrates an exemplary operational environment in which one or more multicast streams may be received by a satellite gateway earth station from an external network and multicast transmitted to multiple terminals, some of which may be covered by different spot beams than others of the multiple terminals.

In various embodiments of the invention, as shown in FIG. 1, one or more multicast streams 100 may be received by a satellite gateway earth station 106 from an external network 102 via a peering router 104. Satellite gateway earth station 106 may replicate and distribute each of the one or more multicast streams to one or more associated terminals 110 via a satellite 108 and multiple spot beams 112, 114 and 116.

In some embodiments, network 102 may be a combination of networks, such as, for example, the Internet, a cellular communication network, a public switched telecommunication network (PSTN), as well as other types of networks.

Each satellite gateway earth station 106 may receive a single copy of the one or more multicast streams from network 102 and may replicate each of the one or more multicast streams to one or more respective specific outroutes within one or more beams.

Figure 2:
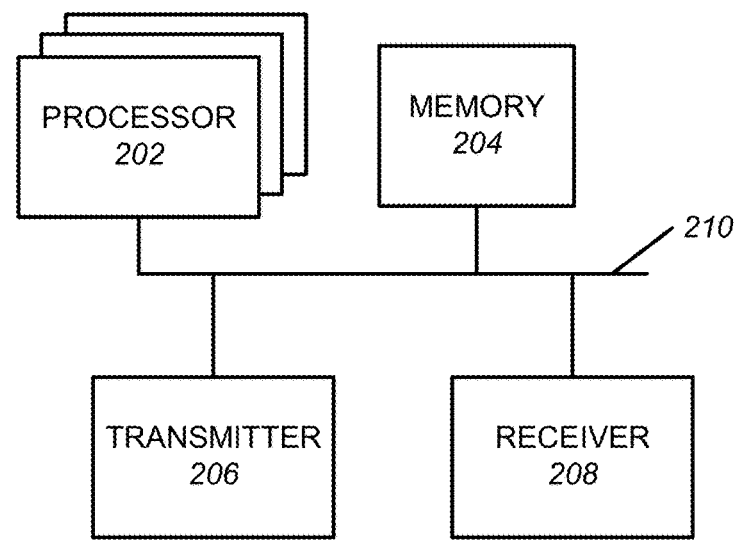
FIG. 2 illustrates a functional block diagram of at least a portion of a processing device that may be included in various embodiments.

FIG. 2 illustrates a functional block diagram of at least a portion of a processing device that may be included within satellite gateway earth station 106, satellite 108, terminals 110 and servers (discussed later).

The processing device may include one or more processors 202, a memory 204, a transmitter 206, and a receiver 208. Each of memory 204, transmitter 206, and receiver 208 may be connected to one or more processors 202 via a communication bus 210.

One or more processors 202 may execute instructions stored in memory 204. Memory 204 may include a read only memory (ROM) and a random access memory (RAM). The ROM may store static information such as, for example, instructions for one or more processors 202 and static data. The RAM may store dynamic information such as, for example, data and/or intermediate or final processing results, as well as static information such as, for example, instructions for one or more processes 202 and static data.

Transmitter 206 may transmit information from memory 204 via a wired or wireless means. Receiver 208 may receive information into memory 204 via the wired or wireless means.

In alternative embodiments, the processing device may include a field programmable gate array (FPGA), an application specific integrated circuit (ASIC), or other logic device, instead of functional components as shown in FIG. 2.

Multicast Traffic Replication

Figure 3:
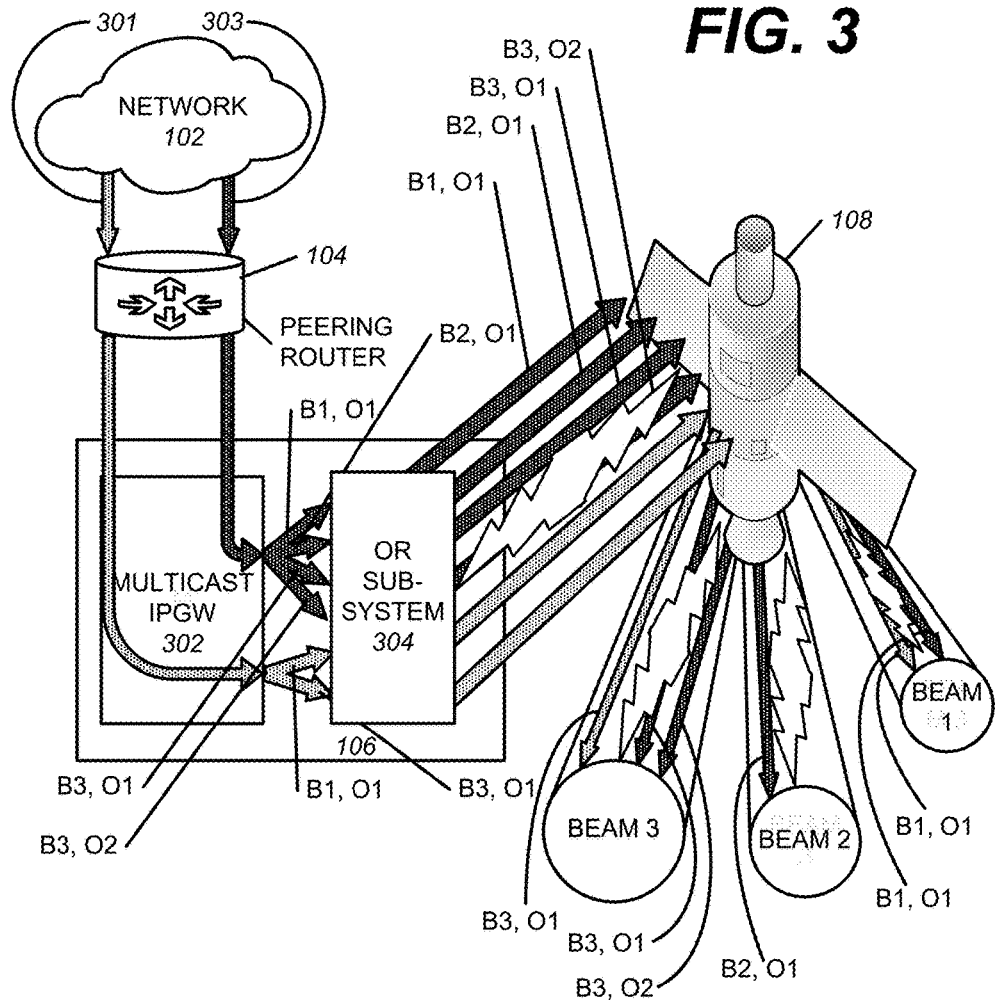
FIG. 3 illustrates an exemplary operational environment in which one or more multicast streams may be received by a satellite gateway earth station operating in dynamic forwarding mode.

FIG. 3 shows a more detailed view of an operational environment shown in FIG. 1. In this embodiment, satellite gateway earth station 106 includes a multicast IP gateway 302 and an outroute subsystem 304. In this example, network 102 provides multicast stream 301 and multicast stream 303 to satellite gateway earth station 106 via peering router 104. Beam 1 and beam 2 include one outroute carrier. Beam 3 includes two outroute carriers. Multicast IP gateway 302 replicates multicast stream 303 to beams 1, 2 and 3 via outroute subsystem 304 and satellite 108, and replicates multicast stream 301 to beams 1 and 3. Beam 1 receives multicast stream 303 on outroute 01, beam 2 receives multicast stream 303 on outroute 01, and beam 3 receives multicast stream 303 on outroutes 01 and 02. Further, beam 1 receives multicast stream 301 on outroute 01 and beam 3 receives multicast stream 301 on outroute 01.

As shown in FIG. 3, replication occurs within satellite gateway earth station 106 and within a domain of a satellite network.

Static and Dynamic Forwarding

In static forwarding mode, a multicast IP gateway may be statically configured for multicast streams that are to be forwarded. The multicast IP gateway may be configured with the following information in regards to how multicast streams are to be forwarded over a satellite interface:
  type of multicast address (IP version 4 or IP version 6)
  IP multicast address
  Spacelink (layer 2) MAC address corresponding to one or more multicast IP addresses
  Number of destinations
  Destination beams and outroute information
  Whether encryption is on or off Upon receiving an IP multicast packet, the multicast IP gateway may use the above statically configured information to determine to which beams and outroute channels to forward the received IP multicast packet. The layer 2 spacelink MAC address indicates which spacelink MAC address to use to send, across outroutes, a received IP packet having a multicast IP address matching one of the one or more multicast IP addresses which correspond to the layer 2 spacelink MAC address. A scope of the spacelink MAC address is between the satellite gateway earth station and terminals in a closed satellite network.

If a set of destination terminals spans multiple outroutes, then a received multicast IP packet is replicated to all of the multiple outroutes. Possible multicast levels of scope may include a) System—sent to every outroute at every gateway, b) Gateway—sent to every outroute and every beam of a specific gateway, c) Beam—sent to every outroute of a specific beam of a specific gateway, and d) Outroute—sent to a specific outroute of a specific beam of a specific gateway.

In static forwarding mode, the multicast IP gateway performs the forwarding before terminals of a multicast group receive join requests from attached downstream devices. In other words, the associated multicast stream may be forwarded over a satellite interface on beams, which may have no receivers listening to the associated multicast stream. Static forwarding has an advantage over dynamic forwarding in that a design for static forwarding and control of quality of service (QoS) offered to each multicast group are simpler.

In dynamic forwarding mode, when downstream receivers or devices first request to join a specific multicast group, the downstream receivers or devices send a join signal over the satellite interface to the satellite gateway earth station in order to join the specific multicast group. The multicast IP gateway of the satellite gateway earth station receives the join signal, sends an Internet group management protocol (IGMP)/multicast listener discovery (MLD) join to the peering router, begins forwarding multicast stream traffic associated with the specific multicast group to the terminal, and continues forwarding the multicast stream traffic associated with the specific multicast group to terminals with one or more downstream receivers or devices that have already joined the specific multicast group, if any. Often, it is not feasible to forward all multicast traffic over satellite spot beams regardless of whether active receivers exist for one or more multicast groups associated with the forwarded multicast traffic. Forwarding of the multicast traffic onto multiple beams of the satellite based on whether any active receivers exist on the multiple beams results in efficient bandwidth usage.

Terminals may be configured to function in either a passive or an active multicast control mode. In the active multicast control mode, IGMP messages for IP version 4, or MLD messages for IP version 6 may be terminated at a proxy agent in a terminal and may also be sent over the satellite interface when the satellite gateway earth station is operating in the dynamic forwarding mode.

Figure 4:
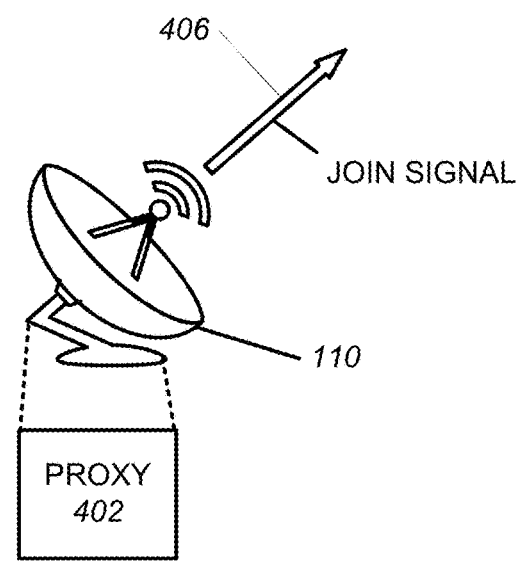
FIG. 4 shows an exemplary terminal, in an active multicast control mode, in which a proxy agent of the terminal sends a join signal to join a specific multicast group.

FIG. 4 shows terminal 110 with a proxy agent 402. Terminal 110, in the active multicast control mode, sends a join signal 406 to the multicast IP gateway via a satellite interface when the multicast IP gateway is operating in the dynamic forwarding mode and a first join request is received by terminal 110 from any downstream receiver or device. The multicast IP gateway may send a IGMP/MLD join to a peering router in response to receiving join signal 406, indicating that at least one downstream receiver or device, with respect to terminal 110, is actually listening for a particular IP multicast address. After receiving the join signal for a first time, the multicast IP gateway, in the dynamic forwarding mode, may forward multicast traffic of the specific multicast group to terminal 110 for delivery to the at least one downstream receiver or device.

A terminal in the passive multicast control mode does not process IGMP or MLD messages. Instead, a local area network (LAN) forwarding policy for multicast streams by the terminal is performed according to a static configuration regardless of whether there are any active downstream receivers or active downstream devices. On the other hand, when the terminal is operating in the active multicast control mode, the proxy agent of the terminal will make a LAN forwarding decision based on whether any IGMP or MLD messages were received by the proxy agent from any downstream active receivers or devices.

Figure 5:
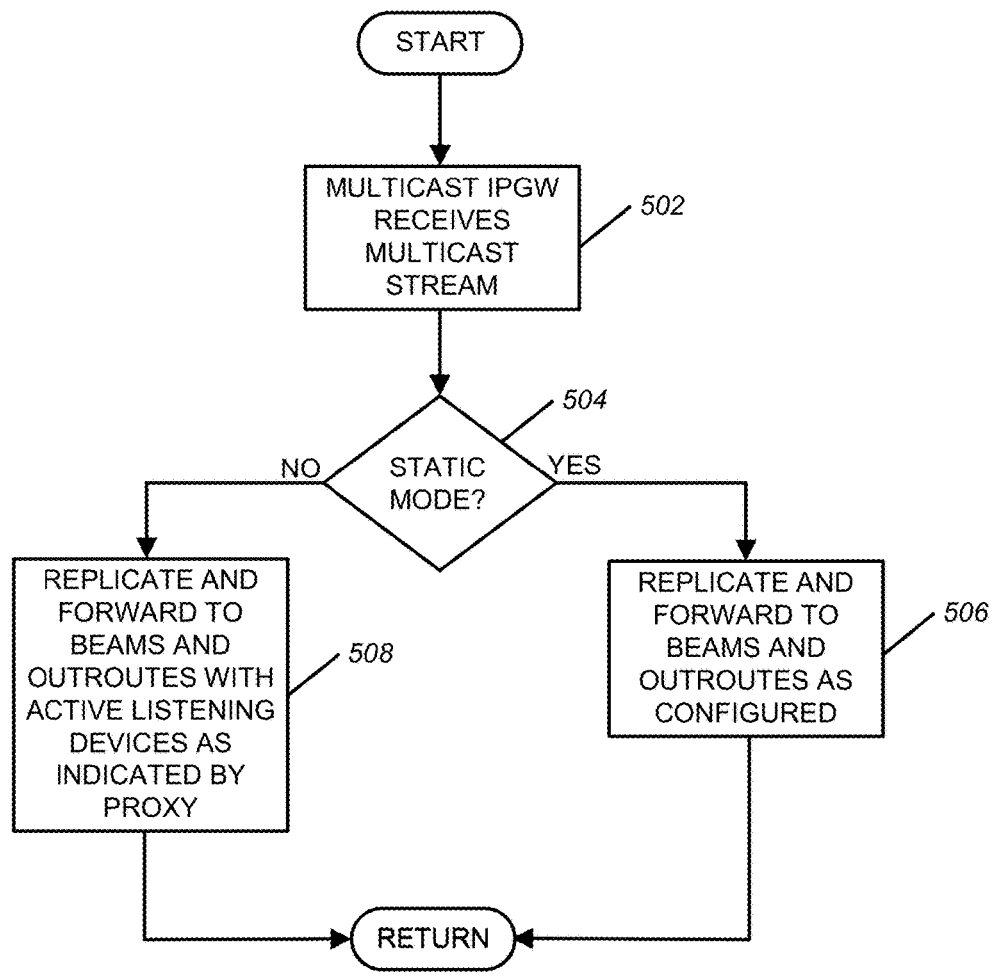
FIGS. 5, 9 and 10 are flowcharts of exemplary processes that may be performed in various embodiments.

FIG. 5 is a flowchart that illustrates an exemplary process that may be performed in various embodiments. At act 502, a multicast IP gateway receives a multicast stream from an external network. The multicast stream is associated with terminals belonging to a specific multicast group. At act 504, the multicast IP gateway determines whether the multicast IP gateway is operating in the static forwarding mode. If the multicast IP gateway is operating in the static forwarding mode, then the multicast IP gateway may replicate and forward multicast traffic of the received multicast stream to beams and outroutes of beams as statically configured (act 506). The process may then be completed.

If, during act 504, the multicast IP gateway determines that it is not operating in the static mode, then it is assumed to be operating in the dynamic forwarding mode. The multicast IP gateway may then replicate and forward the multicast traffic of the received multicast stream to outroutes of beams that have active receiver devices as previously indicated to the multicast IP gateway by a respective proxy agent of one or more terminals sending an IGMP message (IP version 4) or an MLD message (IP version 6) (act 508).

Multi-Operator or Multi-Virtual Network Operator (VNO) Use of Multicast

Multi-operator or multi-VNO use of multicast may be provided in a wholesale/retail network. Multiple layer 3 addresses in a single multicast group may be mapped to a specific layer 2 spacelink MAC address by a first VNO. Thus, the layer 2 spacelink having the specific MAC address may carry multicast IP version 4 or multicast IP version 6 traffic for multiple layer 3 addresses of the single multicast group. A second VNO may map a second group of layer 3 addresses in a second multicast group to a second specific layer 2 spacelink MAC address which may be identical to the specific layer 2 spacelink MAC address to which the multiple layer 3 addresses of the first VNO are mapped. If the above was to occur, it is referred to as an "address overlap."

In order to avoid address overlap, various embodiments which permit a VNO to control a mapping of layer 3 addresses to a specific layer 2 spacelink MAC address, ensure that the layer 2 spacelink MAC address is unique across multiple VNOs. This is accomplished by using a VNO identifier as part of the spacelink MAC address.

Figure 6:
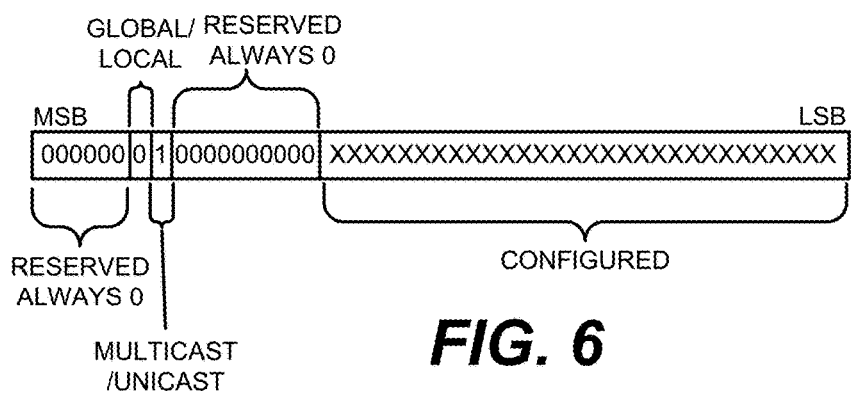
FIG. 6 illustrates an exemplary format for a layer 2 spacelink MAC address.

FIG. 6 shows an exemplary format for a layer 2 spacelink MAC address, which may be used in various embodiments. As shown, six most significant bits of the layer 2 spacelink MAC address may be zero. A next bit may be zero indicating that the layer 2 spacelink MAC address is globally defined. If the bit is a one, then the layer 2 spacelink MAC address is indicated as being locally defined. When the layer 2 spacelink MAC address is used for multicast, the bit is set to one. A following bit is set to one for multicast and zero for unicast. A next 10 bits may always be set to zero. A next 14 bits may be a multicast group ID. A remaining 16 bits may be a VNO identifier.

Multicast Modulation Coding

Each VNO is assigned a minimum, or most robust, multicast modulation coding (MODCOD) which is selected based on an amount of multicast bandwidth sold to a respective VNO. Multicast streams for all subscribed multicast groups for a VNO are always sent on MODCODs that cannot drop below a minimum configured MODCOD for the VNO. For example, if a minimum configured multicast MODCOD is sent using QPSK 5/6 for a particular VNO, no multicast session for the particular VNO will be sent on any MODCOD that is more robust than QPSK 5/6.

A group of terminals belonging to a same multicast group may be eligible to receive traffic on less robust MODCODs than the minimum configured multicast MODCOD for a VNO associated with the group of terminals. The group of terminals, which may belong to one or more multicast groups, may advertise their respective current eligible outroute MODCODs to a multicast IP gateway via a return channel interface, based on each terminal's individual link condition to the multicast IP gateway. The multicast IP gateway may send a multicast stream for terminals of one of the one or more multicast groups on a lowest, or most robust, advertised MODCOD from among the terminals of the multicast group as long as the lowest, or most robust, advertised MODCOD is not lower, or more robust, than the minimum configured multicast MODCOD for the VNO.

When a MODCOD receiving eligibility of a terminal belonging to a multicast group changes, the terminal may send, through the return channel interface: the multicast group(s) to which the terminal belongs; and a current eligible MODCOD for the terminal.

The receiving multicast IP gateway may keep track of a respective minimum MODCOD from each respective multicast group based on all MODCODs advertised from terminals belonging to each of the respective multicast groups. If a terminal joins a multicast group while a multicast stream is being transmitted to the terminals belonging to the multicast group, and the terminal has a link condition which is worse than respective link conditions of the terminals currently receiving the multicast stream, the joining terminal may lose packets until the joining terminal advertises a current eligible outroute MODCOD to the multicast IP gateway.

Privacy of Multicast Traffic

Multicast streams may be securely transmitted to destination terminals. Conditional access keys that encrypt multicast sessions may be downloaded to the destination terminals authorized to receive the multicast streams. A hitless key update scheme may be provided in various embodiments. A layer 2 spacelink MAC address, which identifies a multicast group and may carry data for multiple IP version 4 multicast addresses and/or multiple IP version 6 multicast addresses may have only one conditional access key to be managed for the multiple IP multicast addresses belonging to the multicast group identified by the layer 2 spacelink MAC address. Conditional access support may be provided to authorized terminals belonging to the multicast group by providing decryption keys only to the authorized terminals. Security mechanisms may include, but not be limited to, American Encryption Standard counter mode (AES-CTR) and 256-bit keys.

Encryption

Figure 7:
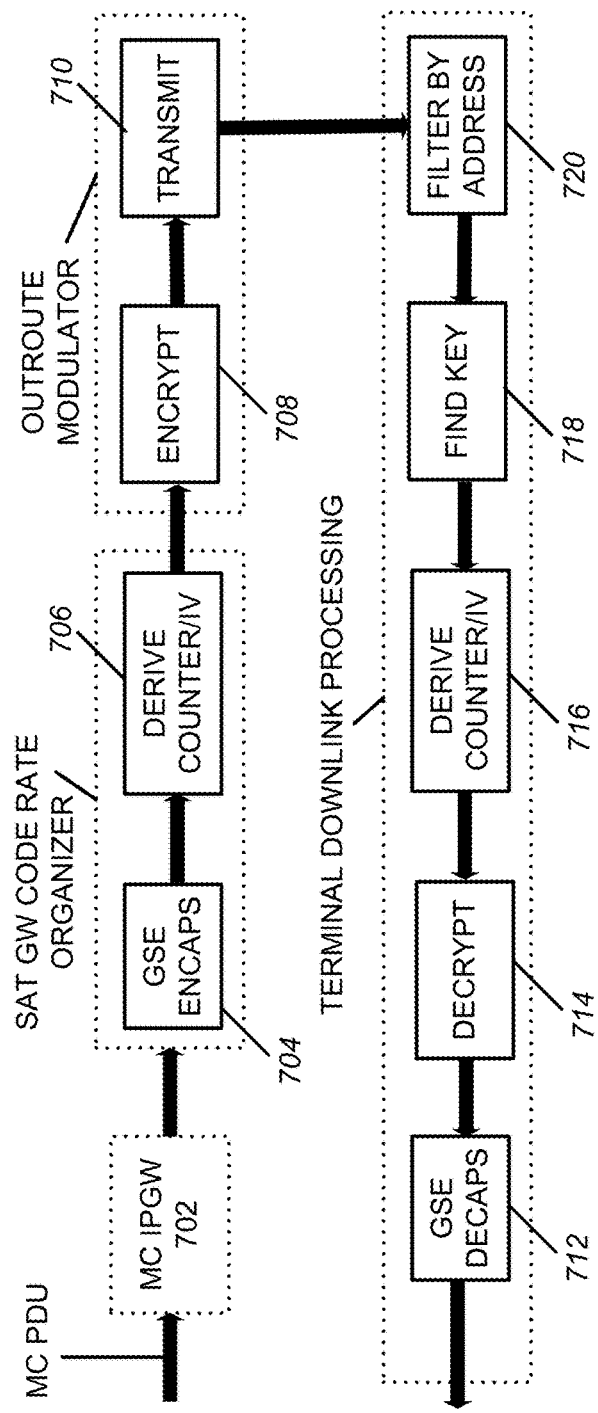
FIG. 7 illustrates a process of encrypting and decrypting a multicast stream.

FIG. 7 helps to illustrate encryption and decryption of a multicast stream. A multicast IP gateway 702 may receive a multicast protocol data unit (PDU), may generate a multicast session key, if not already generated, and may provide the received PDU and the multicast session key to a satellite gateway code rate organizer of a satellite gateway earth station. The satellite gateway code rate organizer may perform generic stream encapsulation 704 of the PDU to produce a generic stream encapsulated packet. The satellite gateway code rate organizer may then derive a counter, or initialization vector 706, and may provide the generic stream encapsulated packet, the multicast session key, and the counter or initialization vector to an outroute modulator of the satellite gateway earth station. The outroute modulator may then encrypt 708 the generic stream encapsulated packet using the multicast session key and the counter or initialization vector, and may transmit the encrypted generic stream encapsulated packet 710 to a terminal. The terminal may perform terminal downlink processing, which may include filtering the received encrypted generic stream encapsulated packet by address 720, finding a decryption key 718, deriving a counter or initialization vector 716, decrypting the encrypted generic stream encapsulated packet using the decryption key and the counter or initialization vector to produce a decrypted generic stream encapsulated packet 714, and decapsulating the decrypted generic stream encapsulated packet to produce the multicast PDU 712.

Key Generation and Distribution

In various embodiments, a key management subsystem may be provided. The key management subsystem may include a key management server (KMS) and a key dispatcher (KD). The KMS is responsible for managing security keys and is located at a network operations center (NOC). The NOC is a central location where a company's servers and networking equipment are located. In some embodiments, the KMS is located in a network management subsystem, which may be included in one or more servers at the NOC.

The KD is a network management subsystem application. One instance of the KD may reside in each satellite gateway earth station. The KD receives and caches keys from the KMS and may request keys that it lacks from the KMS in response to receiving a key request from a terminal.

An auto-commissioning server (ACS) may work with the KMS and the KD such that the KMS, the KD and the ACS may provide functions which may include, but not be limited to, key loading, key generation, key distribution, and periodic key updates.

Figure 8:
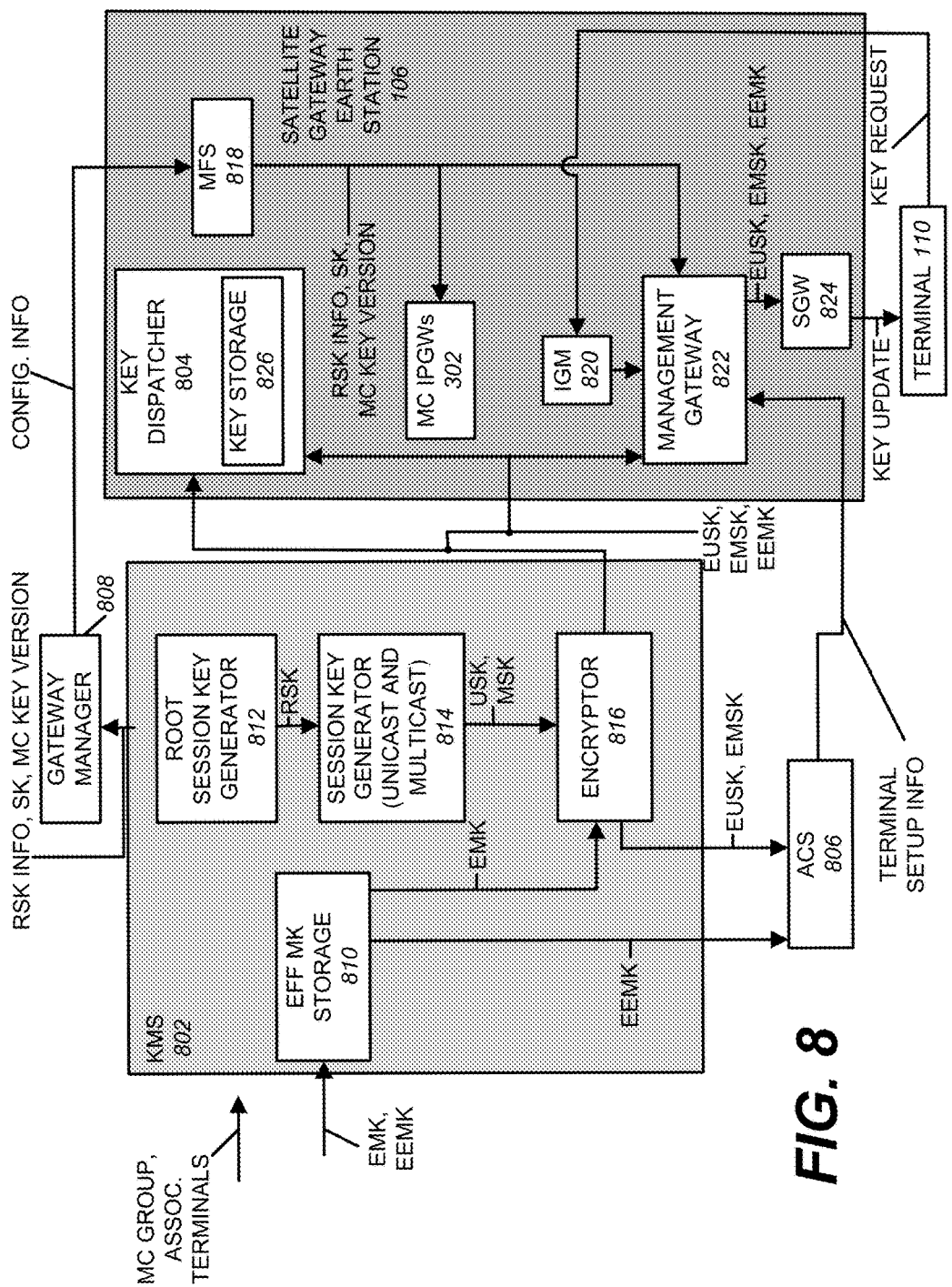
FIG. 8 shows an exemplary key management subsystem that may be implemented in various embodiments.

FIG. 8 illustrates an exemplary key management subsystem that may be implemented in various embodiments. The exemplary key management subsystem may include a key management server 802, which may be located at the NOC, an instance of a key dispatcher 804 executing in the satellite gateway earth station 106, an ACS 806 and a gateway manager 808, which may execute in a server at the NOC.

KMS 802 may include effective master key storage 810, a root session key generator 812, a session key generator 814, and an encryptor 816.

A management application (not shown), executing on at least one server at the NOC, may provide KMS 802 with one or more layer 2 spacelink MAC addresses, each of which may be associated with a respective multicast group, along with terminal information regarding terminals associated with the respective multicast group. The terminal information may include a respective multicast IP address for each terminal associated with each respective multicast group.

Effective master key storage 810 may receive effective master keys (EMKs) and encrypted effective master keys (EEMKs), each of which is associated with a respective terminal associated with one or more respective multicast groups. Each of the respective terminals may have a unique EMK and a unique EEMK. In some embodiments, effective master key storage 810 may receive the EMK and the EEMK for each of the respective terminals using a key encryption protocol. Effective master key storage 810, which may be a database is some embodiments, may provide the EEMK to ACS 806 and may provide the EMK to encryptor 816. Root session key generator 812 may generate a root session key (RSK), which may be used by all of the respective terminals. Root session key generator 812 may provide the RSK to session key generator 814. Session key generator 814 may generate multicast session keys (MSKs) for multicast sessions and unicast session keys (USKs) for unicast sessions. Session key generator 814 may provide the USK or the MSK to encryptor 816, which may encrypt the USK or the MSK using the EMK for each of the respective terminals to produce either an encrypted USK (EUSK) or an encrypted MSK (EMSK), which may be provided to key dispatcher 804 of satellite gateway earth station 106.

Satellite gateway earth station 106 may include one instance of a key dispatcher (KD) 804, a mounted file system (MFS) 818, one or more multicast gateways 302, an inroute group manager (IGM) 820, a management gateway 822, and a satellite gateway (SGW) 824.

KD may include key storage 826, which in some embodiments may include a storage area network (SAN). KD 804 may receive the EUSK or the EMSK, and the EEMK from encryptor 816 of KMS 802. KD 804 may provide the EUSK or the EMSK, and the EEMK to management gateway 822. Gateway manager 808 may receive root session key information, the USK or the MSK, and a multicast key version (collectively, configuration information) from KMS 802 and may provide the configuration information to MFS 818 of satellite gateway earth station 106. When the configuration information includes the MSK, MFS 818 may provide the configuration information to one or more multicast IP gateways 302 and management gateway 822. SGW 824 may receive the EUSK or the EMSK, and the EEMK from management gateway 822 and may provide the EUSK or the EMSK, and the EEMK to a respective associated terminal 110, each of the EUSK or the EMSK, and the EEMK having been previously encrypted by encryptor 816 of KMS 802 using the EMK associated with the respective terminal 110.

When terminal 110 is commissioned, KMS 802 sends, via ACS 806, an initial terminal key set to terminal 110. The initial terminal key set may include a MSK or a USK for terminal 110.

In various embodiments, the MSK is updated upon an occurrence of one of a number of events. The events may include, but not be limited to:
  a root session key, from which the MSK derived, is changed;
  one or more terminals from an existing multicast group are deleted or decommissioned; and
  a new multicast group is configured with the associated terminals; and
  one or more terminals are added into an existing multicast group.

When the root session key is changed, KMS 802 pushes keys to KD 804. KD 804 then may push the keys to all terminals.

When a multicast group is added to the system or deleted from the system, this may be reflected in a terminal multicast group configuration file, which may be provided by a gateway manager 808 to MFS 818 of satellite gateway earth station 106. KMS 800 may push new keys to a respective KD 804 of each satellite gateway earth station 106. Terminal 110 may receive the new multicast group configuration file and may send a key request message to KD 804 in order to obtain keys.

When a terminal 110 is added to a multicast group or deleted from a multicast group, a key set of terminal 110 is updated. In this case, however, only the key set of the added or the deleted terminal 110 is affected.

In some embodiments, when the terminal 110 is deleted from the multicast group without changing the root session key, keys for all terminals 110 remaining in the multicast group may be updated for security reasons.

Figure 9:
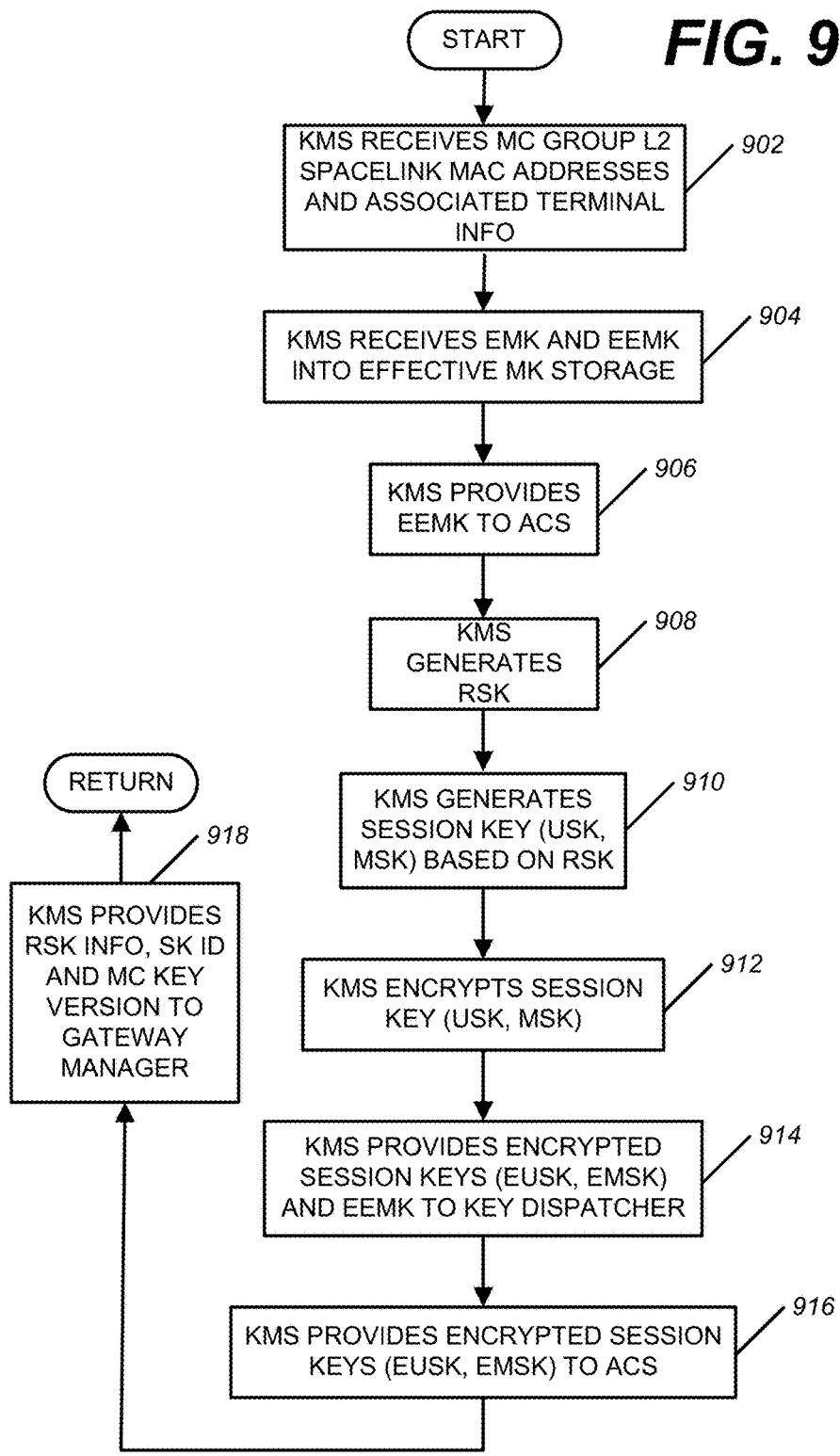

FIG. 9 is a flowchart of an exemplary process that may be performed by KMS 802 in various embodiments. The process may begin with KMS 802 receiving information regarding one or more multicast groups and associated terminals of each of the multicast groups (act 902). The information may include a layer 2 spacelink MAC address for carrying respective multicast IP PDUs and IP multicast addresses associated with terminals belonging to a respective multicast group. Next, KMS 802 may receive an EMK and an EEMK into the effective master key storage (act 904), which may be a database in some embodiments. KMS 802 may provide EEMK to ACS 806 (act 906).

Root session key generator 812 of KMS 802 may generate a root session key (RSK) (act 908) and may provide the RSK to session key generator 814, which may generate a unicast session key (USK) or a multicast session key (MSK) based on the RSK (act 910). Encryptor 816 receives the USK or the MSK from session key generator 814 and receives the EMK from effective master key storage 810, encrypts the USK or the MSK, and the EMK using the EMK for each terminal associated with the session key (USK or MSK) to produce respective encrypted session keys (EMSK or EUSK) and an encrypted EMK (EEMK) for one or more corresponding terminals (act 912), and provides the respective encrypted session keys to ACS 806 and the respective EEMKs as well as the respective encrypted session keys to KD 804 of satellite gateway earth station 106 (act 914). KMS 802 may provide the EEMK for respective terminals from effective master key storage 810 to ACS 806 (act 916). KMS 802 may then provide RSK information, SK ID and multicast key version to gateway manager 808. The process may then be completed.

Figure 10:
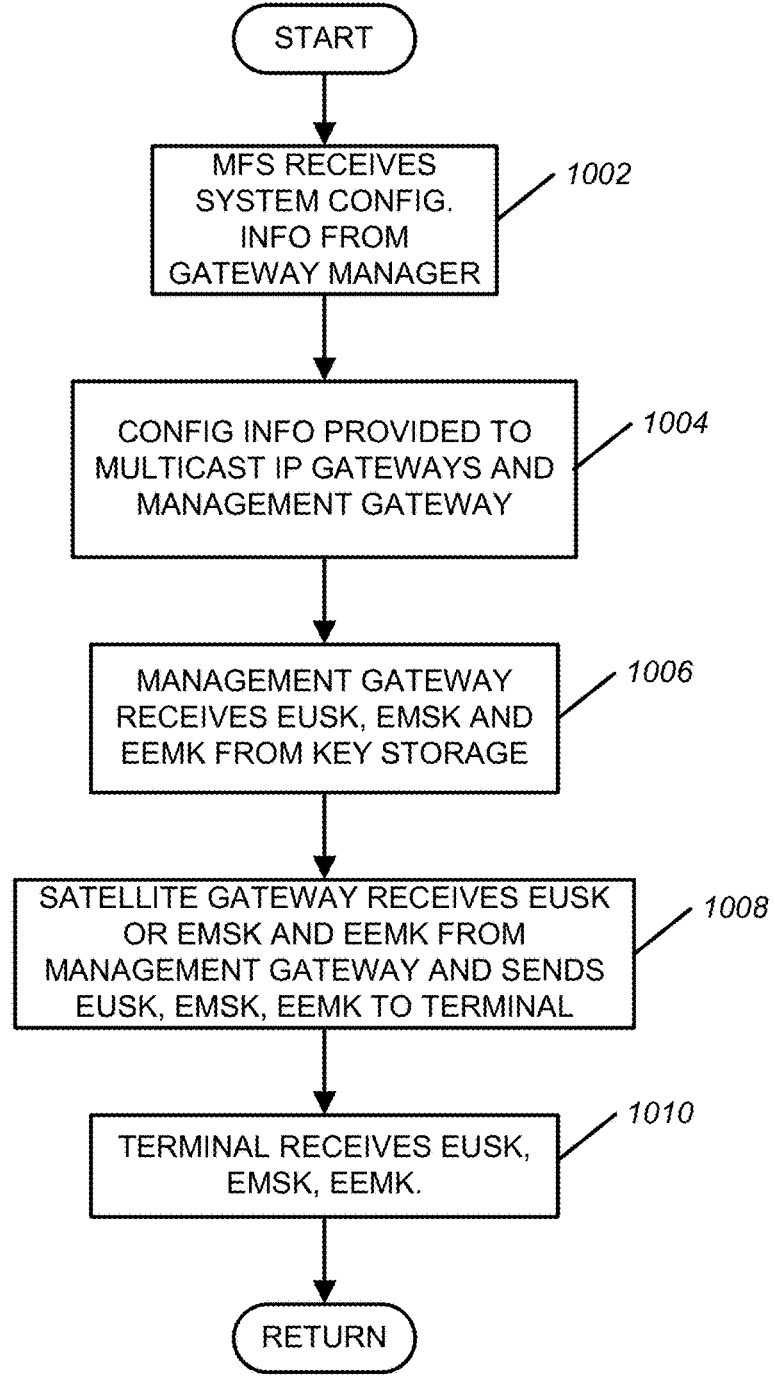

FIG. 10 is a flowchart of an exemplary process that may be performed by satellite gateway earth station 106 in various embodiments. The process may begin with MFS 818 receiving system configuration information from gateway manager 808 (act 1002). The system configuration information may include information regarding the RSK, the session key (SK) and a multicast key version. MFS 818 may provide the configuration information to one or more multicast IP gateways 302 of satellite gateway earth station 106 and management gateway 822 (act 1004). Management gateway 822 may receive the EUSK or the EMSK, as well as the EEMK from key storage 826 of key dispatcher 804 (act 1006). SGW 824 may receive the EUSK or the EMSK, as well as the EEMK and may send the EUSK or the EMSK and the EEMK to terminal 110 (act 1008). Terminal 110 may then receive the EUSK or the EMSK, as well as the EEMK (act 1010). The process may then be completed.

Prioritization Schemes

Prioritization schemes may be applied to multicast sessions, as well as unicast sessions, and are guided by quality of service (QoS) requirements. A multicast session can be classified into one of a number of classes including, but not limited to, conversational, streaming, and bulk. Priority of multicast traffic may be either statically configurable or can be conveyed through Differentiated Services Code Point (DSCP) marking. When congestion occurs, packets may be dropped to match available bandwidth for a link. As previously mentioned a VNO may subscribe to an aggregate multicast bandwidth for a beam or a system.

Each VNO can subscribe its own quota of multicast committed information rate (CIR) as part of a bandwidth subscription from a host network operator (HNO). A VNO may specify policies that determine which multicast sessions to completely drop during oversubscription or congestion, instead of having the system drop some percentage of traffic from each of the multicast sessions. As an example, suppose a VNO subscribed three multicast groups, MC1, MC2 and MC3, with a total multicast bandwidth of 20 Mbps on a beam, and bit rates of the three multicast groups are 5 Mbps, 8 Mbps and 7 Mbps, respectively. Suppose the VNO set a policy such that during congestion no new multicast stream be admitted if bandwidth is not available. Because of degradation of a condition of a link, the VNO is currently using 13 Mbps bandwidth. Streams from multicast groups MC1 and MC2 will be admitted, but when a stream from the multicast group MC3 appears, all packets of MC3 will be dropped.

The above policy is only exemplary. In various embodiments, a VNO may specify more complex policies.

Miscellaneous

Terminals may have dual or multiple physical local area network (LAN) ports that can be configured to support multicast group membership to a specific terminal LAN port. Further, when a virtual local area network (VLAN) is configured for the terminal, multicast membership may be extended to a particular VLAN.

In addition, various embodiments support multicast reception by mobile terminals. While the mobile terminal moves between beams, outroutes and gateway stations, the mobile terminal can continue to receive its authorized multicast streams.

In an embodiment which provides VNO support, two use cases of multicast service may exist:
Global Multicast Group—provided by a HNO and available for subscription by all VNOs. Typically, the stream is not encrypted and is transmitted using a proprietary defined all-terminals multicast address.
VNO-specific Multicast Group—provided by individual VNO and available for subscription only bike terminals on by a specific VNO. A VNO can provide free-to-air multicast service, as well, which can be received by all terminals belonging to VNO.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim as my invention:

1. A satellite communication system comprising:
one or more satellite gateway earth stations; and
a satellite configured to communicate with a plurality of terminals via a plurality of spot beams formed by the satellite, each of the plurality of terminals being arranged to receive communications via the satellite and a respective spot beam of the plurality of spot beams, wherein:
  the one or more satellite gateway earth stations is arranged to receive one or more multicast streams from an external network, and
  when a satellite gateway earth station of the one or more satellite gateway earth stations is configured to be in a static forwarding mode, the satellite gateway earth station is statically configured to replicate and forward each of the one or more multicast streams over one or more first respective outroute carriers of at least one first respective spot beam of the plurality of spot beams regardless of whether any terminals are arranged to actively receive any of the one or more multicast streams, and
  when the satellite gateway earth station is configured to be in a dynamic forwarding mode, the satellite gateway earth station is dynamically configured to replicate and forward ones of the one or more multicast streams over one or more second respective outroute carriers of at least one second respective spot beam of the plurality of spot beams only when at least one respective terminal is arranged to actively receive each of the ones of the one or more multicast streams over the one or more second respective outroute carriers of the at least one second respective spot beam of the plurality of spot beams.

2. The satellite communication system of claim 1, wherein the plurality of spot beams are Ka-band spot beams.

3. The satellite communication system of claim 1, further comprising:
the plurality of terminals, wherein
  each of the plurality of terminals that are in an active mode include a proxy agent, such that the proxy agent in each respective terminal of the plurality of terminals that are in the active mode makes a determination whether to forward a received multicast stream on a local area network only when at least one respective active receiver is downstream of the respective terminal of the plurality of terminals that are in the active mode.

4. The satellite communication system of claim 1, further comprising:
the plurality of terminals, wherein
  each terminal of the plurality of terminals belonging to any multicast group advertises a respective current eligible outroute modulation coding and multicast membership information based on an individual link condition of the each terminal to the satellite gateway earth station, and
  responsive to receiving the advertised respective current eligible outroute modulation coding and multicast membership information from each of the plurality of terminals belonging to the any multicast group, the satellite gateway earth station sends the multicast stream for a multicast group on a lowest or most robust advertised outroute modulation coding advertised by each terminal of the plurality of terminals receiving the multicast stream on the multicast group.

5. The satellite communication system of claim 3, wherein
when the satellite gateway earth station is configured to be in the dynamic forwarding mode, the respective proxy agent in each of the plurality of terminals, that are arranged to actively receive at least one respective multicast stream of the ones of the one or more multicast streams, forwards information to the satellite gateway earth station informing the satellite gateway earth station to forward the at least one respective multicast stream of the ones of the one or more received multicast streams over the one or more second respective outroute carrier of the at least one second respective spot beam associated with each of the plurality of terminals that are arranged to actively receive the at least one respective multicast stream of the ones of the one or more multicast streams.

6. The satellite communication system of claim 5, further comprising:
a peering router arranged to communicate with the external network and the satellite gateway earth station, wherein the satellite gateway earth station sends a join signal to the peering router for each multicast address associated with a multicast stream that the satellite gateway earth station is configured to forward.

7. The satellite communication system of claim 1, wherein
the satellite gateway earth station is configured to map one or more multicast IP addresses to a single layer 2 spacelink MAC address, such that the satellite gateway earth station sends a packet associated with one of the one or more multicast IP addresses to a plurality of destination terminals using the single layer 2 spacelink MAC address over one or more outroute carriers of one or more spot beams associated with any of the plurality of destination terminals.

8. The satellite communication system of claim 7, wherein packets having a respective multicast IP address that matches any one of the one or more mapped multicast IP addresses are encrypted based on a single multicast key before the packets are sent, using the single layer 2 spacelink MAC address, to respective terminals.

9. The satellite communication system of claim 7, wherein
the layer 2 spacelink MAC address includes a virtual network operator identifier to ensure that the layer 2 spacelink address is unique across layer 2 spacelink addresses for a plurality of virtual network operators.

10. The satellite communication system of claim 7, wherein:
the satellite gateway earth station comprises a key dispatcher for distributing a multicast session key to ones of the plurality of terminals belonging to a multicast session and for handling requests for the multicast session key from at least one of the ones of the plurality of terminals belonging to the multicast session; and
the satellite gateway earth station encrypts, using the multicast session key, traffic to be sent to the at least one of the ones of the plurality of terminals belonging to a multicast group.

11. The satellite communication system of claim 10, wherein the multicast session supports a hitless key update mechanism.

12. The satellite communication system of claim 1, wherein a priority of multicast traffic is configurable either statically or through differentiated services code point marking.

13. The satellite communication system of claim 12, wherein a virtual network operator is permitted to specify policies that drive which multicast sessions are dropped during oversubscription or congestion.

14. A method for providing support for multicast sessions in a satellite communication system, the method comprising:
receiving, by a satellite gateway earth station, a multicast stream from an external network;
replicating and forwarding, by the satellite gateway earth station, the multicast stream over at least one respective outroute carrier of at least one respective spot beam of a plurality of spot beams of a satellite regardless of whether one or more terminals are arranged to actively receive the multicast stream over the at least one respective outroute carrier, when the satellite gateway earth station is configured to be in a static forwarding mode; and
replicating and forwarding, by the satellite gateway earth station, the multicast stream over at least one respective outroute carrier of at least one respective spot beam of a plurality of spot beams of a satellite only when a respective terminal is arranged to actively receive the multicast stream over each of the at least one respective outroute carrier of each of the at least one respective spot beam, when the satellite gateway earth station is configured to be in a dynamic forwarding mode.

15. The method of claim 14, further comprising:
receiving information, by the satellite gateway earth station from a terminal via a satellite, the information informing the satellite gateway earth station to forward received traffic from the multicast stream to the terminal via an outroute of a spot beam of the satellite that communicates with the terminal, when the satellite gateway earth station is configured to be in the dynamic forwarding mode.

16. The method of claim 14, further comprising:
mapping, by the satellite gateway earth station, one or more multicast IP addresses to a single layer 2 spacelink MAC address, such that the satellite gateway earth station sends a packet associated with any of the one or more multicast IP addresses to a plurality of destination terminals using the single layer 2 spacelink MAC address over one or more outroute carriers of one or more spot beams associated with any of the plurality of destination terminals.

17. The method of claim 16, wherein the layer 2 spacelink MAC address includes a virtual network operator identifier.

18. The method of claim 14, further comprising:
distributing a multicast session key, by a key dispatcher included in the satellite gateway earth station, to ones of a plurality of terminals associated with a multicast session of the multicast stream; and
encrypting, using the multicast session key, multicast traffic of the multicast stream before sending the multicast traffic to the ones of the plurality of terminals associated with the multicast session.

19. The method of claim 18, further comprising:
storing, by a key management system, effective master keys in a database, each of the effective master keys being based on a respective master key associated with a respective terminal, each of the respective master keys being unique among the master keys associated with the respective terminals;

generating, by the key management system, a root session key;

generating, by the key management system, a multicast session key based on the root session key;

encrypting, by the satellite gateway earth station, the multicast session key by a respective effective session master key for each respective terminal of the multicast session to produce a respective encrypted multicast session key for each of the respective terminals of the multicast session; and providing, by the satellite gateway earth station, each respective encrypted multicast session key to a corresponding respective terminal of the multicast session.

20. The method of claim 14, further comprising:

either statically configuring a priority of a multicast session including the multicast stream, or configuring the priority of the multicast session through differentiated services code point marking.

21. The method of claim 20, further comprising:

providing a facility for a virtual network operator to specify policies that drive which multicast sessions are dropped during oversubscription or congestion.

\* \* \* \* \*